US007376957B1

United States Patent
Scurlock, Jr.

(10) Patent No.: US 7,376,957 B1
(45) Date of Patent: May 20, 2008

(54) METHOD AND SYSTEM FOR RECOVERING STRANDED OUTBOUND MESSAGES

(75) Inventor: James E. Scurlock, Jr., Helena, AL (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 651 days.

(21) Appl. No.: 10/319,489

(22) Filed: Dec. 16, 2002

(51) Int. Cl.
- *G06F 3/01* (2006.01)
- *G06F 9/46* (2006.01)

(52) U.S. Cl. ...................................... 719/314; 719/312
(58) Field of Classification Search ........ 719/312–314; 710/54; 370/412–418
See application file for complete search history.

(56) References Cited

U.S. PATENT DOCUMENTS

| | | | | |
|---|---|---|---|---|
| 5,465,328 A | * | 11/1995 | Dievendorff et al. | 714/15 |
| 5,878,056 A | * | 3/1999 | Black et al. | 714/748 |
| 6,088,796 A | * | 7/2000 | Cianfrocca et al. | 713/152 |
| 6,138,158 A | * | 10/2000 | Boyle et al. | 709/225 |
| 6,434,605 B1 | * | 8/2002 | Faulkner et al. | 709/213 |
| 6,446,206 B1 | | 9/2002 | Feldbaum | 713/175 |
| 6,636,855 B2 | * | 10/2003 | Holloway et al. | 707/10 |
| 6,654,805 B1 | * | 11/2003 | Aldred et al. | 709/224 |
| 6,760,911 B1 | * | 7/2004 | Ye | 719/314 |
| 6,817,018 B1 | * | 11/2004 | Clarke et al. | 719/313 |
| 6,965,765 B2 | * | 11/2005 | Creemer et al. | 455/413 |
| 7,039,671 B2 | * | 5/2006 | Cullen | 709/201 |
| 7,249,163 B2 | * | 7/2007 | Hickson et al. | 709/213 |
| 2002/0087704 A1 | * | 7/2002 | Chesnais et al. | 709/228 |
| 2002/0120717 A1 | * | 8/2002 | Giotta | 709/219 |
| 2003/0195811 A1 | * | 10/2003 | Hayes et al. | 705/26 |

OTHER PUBLICATIONS

Cobb, The impact of object technology on commercial transaction processing, The VLDB Journal—The International Journal on Very Large Data Bases, vol. 6, Issue 3 (Aug. 1997) pp. 173-190 Springer-Verlag New York, Inc.*

Jung et al., Design of Mobile MOM: Message oriented middleware service for mobile computing, Parallel Processing, 1999. Proceedings. 1999 International Workshops on, Sep. 21-24, 1999, pp. 434-439.*

* cited by examiner

*Primary Examiner*—William Thomson
*Assistant Examiner*—Richard Pantoliano, Jr.
(74) *Attorney, Agent, or Firm*—Merchant & Gould

(57) ABSTRACT

A method for recovering and requeueing lost messages is disclosed. The lost messages are intended for delivery from a first computer program to a second computer program but are instead stranded in locations internal to the first program. The method extracts one or more of these stranded messages from the location internal to the first program, determines the original destination of each stranded message and delivers that message to the second program. Delivery of each message to the second program is facilitated by using message queues provided by middleware type software programs. The desired middleware program can be selected by the user of the method, and the method provides for the necessary formatting of each recovered message according to the selected middleware. Absent use of the present method, these stranded messages would not be routed to their original destinations.

9 Claims, 1 Drawing Sheet

METHOD AND SYSTEM FOR RECOVERING STRANDED OUTBOUND MESSAGES

FIELD OF THE INVENTION

The present invention relates to queuing systems for messages delivered between two software applications.

BACKGROUND

Independent software programs that could also be running on different platforms have a need to exchange messages such as data. In order to send such messages, a source program sends a message to a destination external to the source program. An exit routine within the source program recognizes that the message is bound for a destination outside of the source program. The externally bound message is routed to message queue in a middleware program. This middleware program acts as a bridge between the source program and a separate independent destination program.

Errors can occur during the routing of these outbound messages from the source program through the middleware program, and instead of being routed through the middleware, the outbound messages are misdirected or stranded in default message queues internal to the source program. For example, these messages are sent to a destination that, although originally valid for outward bound messages, becomes invalid or is no longer recognized as directed to the middleware for routing outside the source application. Once stranded in an internal default, message queue, these messages are effectively "lost" and are never recovered or delivered to the destination program. The source program does not contain a utility or routine to recover these misdirected messages. In fact, the source program may not even recognize that the messages are lost and may not be able to determine the location of the lost messages.

A method is needed to identify messages bound for delivery outside of a source program but misdirected and not delivered. What is needed are suitable methods that would identify the misdirected messages, extract the messages from the location to which the messages were improperly delivered and re-route or re-queue these messages through the middleware.

SUMMARY OF THE INVENTION

Embodiments of the present invention include a method, computer executable code and programmed computer system for recovering a plurality of messages stranded in a destination internal to a first computer executable program and intended for delivery to a second computer executable program through a middleware computer executable program. An embodiment of the present invention recovers a plurality of component messages stranded in a destination or location internal to the first program and routes these recovered messages to a message queue in a middleware software program for delivery to the second computer program to which these stranded messages should have been delivered originally. The recovery method includes extracting a plurality of component messages from the destination internal to the first program, reassembling the logs records as necessary to create the plurality of stranded messages and saving the messages to a stranded message file on an appropriate computer readable storage medium.

The operator utilizing a method of the present invention can select the middleware to be used and can identify the message queue within the selected middle for routing of the recovered messages. These selections are provided to the method of the present invention as inputs, for example as input parameters from a user to the computer executable code. In one embodiment, all of the messages or entries in the stranded message file are read. During reading, the original destination of the message is determined, and the message is reformatted for delivery to the middleware message queue and ultimate delivery to the original destination. After the messages have been read and routed through the middleware, the method of the present invention closes the queue and disconnects from the middleware program. If desired, reports detailing the results of the recovery process can be generated and outputted.

The method of the present invention provides the advantages and benefits of recovering and redelivering stranded messages that would otherwise be unrecoverable. Therefore, these messages, which can include large data files, do not have to be recreated.

DETAILED DESCRIPTION

Figure 1:
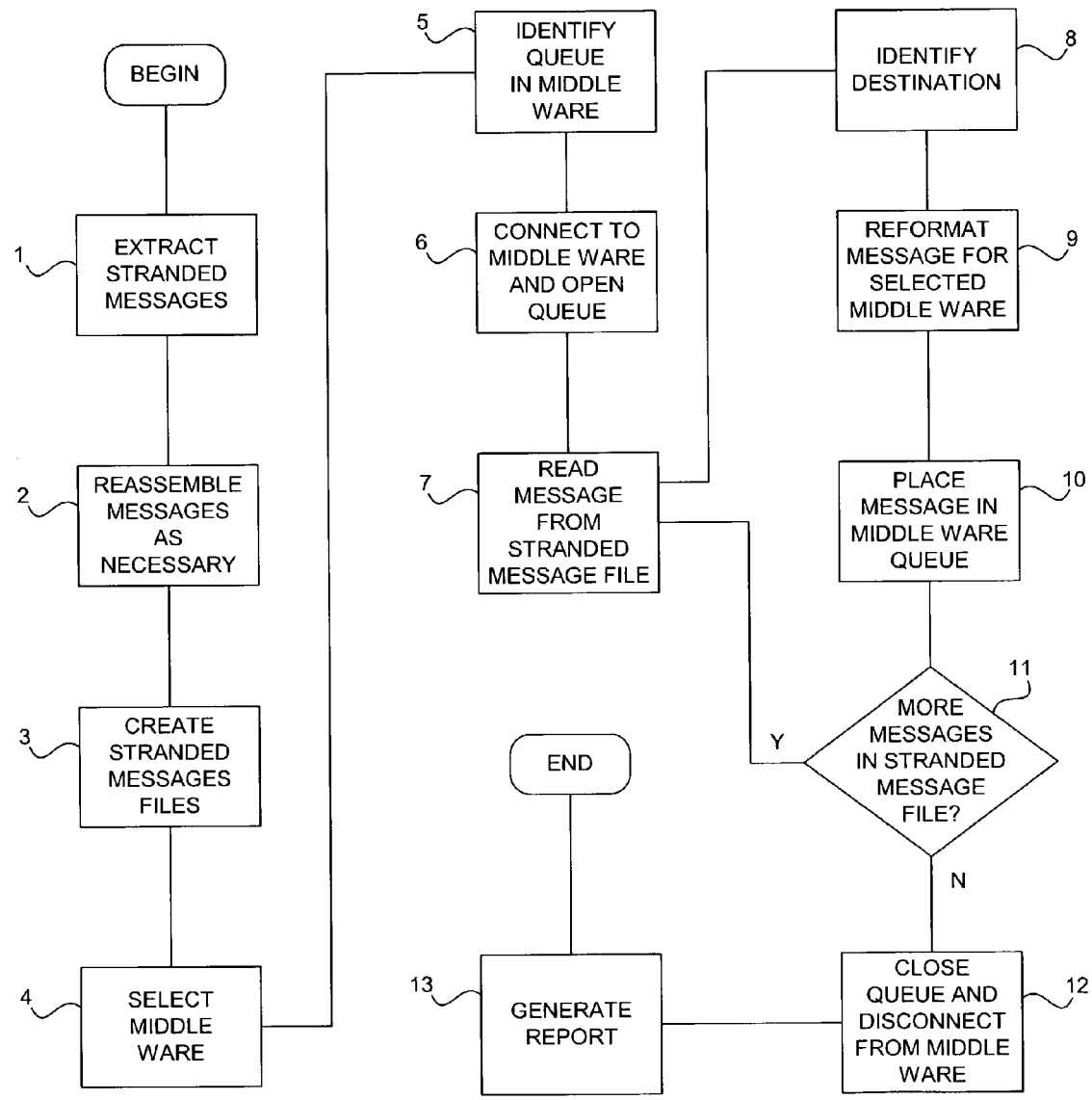
FIG. 1 is a flow chart illustrating an embodiment of a method for recovering lost messages according to the present invention.

A method according to the present invention recovers at least one and preferably a plurality of messages stranded in a destination internal to a first computer executable program and intended for original delivery to a second computer executable program. Delivery of the stranded messages is through a middleware type computer executable program. The first and second computer executable programs are any computer program containing computer executable code stored on a computer readable storage medium and executable by a logical processor. These computer programs can operate on any one of a number of computer platforms including DOS, Windows, UNIX, VAX, and mainframe platforms. In one embodiment, the platform is an IBM mainframe. The first and second computer executable programs can be the same program, can be different programs, can be on the same platform and can be on different platforms. Suitable first and second computer programs include Information Management System (IMS) programs, commercial available from IBM Corporation of Armonk, N.Y.

The middleware program is selected to serve as a bridge between the first computer executable program and the second computer executable program for routing messages between the two programs. The middleware program contains at least one message queue for receiving messages, such as data or other types of files, that are destined from the first program to the second program. Suitable middleware programs can connect to and interface with the programs and platforms of the first and second computer programs. In one embodiment, the middleware computer program is MQSeries® or Websphere MQ® commercially available from IBM Corporation of Armonk, N.Y.

An embodiment of the present invention includes a computer executable code for executing the steps of the method. The computer executable code utilizes algorithms readily available and known to one of skill in the art and can be written in any suitable language, for example assembler language, based upon compatibility with the platforms and languages of the first computer program, the second computer program and the middleware program.

Another embodiment of the present invention includes a computer system or programmed computer for executing a method and computer executable code according to the present invention. Any conventional computer system available and known to one of skill in the art can be used in this embodiment and should be compatible for reading and executing the computer executable code embodying a method according to the present invention. The programmed computer includes a computer readable memory having at least one region to store the computer executable program code that embodies the method of the present invention and a processor for executing the program code stored in that memory. Suitable memory includes Random Access Memory, Compact Disc Read Only Memory, a hard-disk type drive, a tape drive, a floppy disk type drive, and combinations thereof.

In order to recover lost or stranded messages using a computer executable code recovery program embodying a method according to the present invention as illustrated in FIG. 1, the recovery program extracts at least one stranded message from a memory destination or address that represents a location internal to the first program 1. Preferably, the recovery program extracts a plurality of stranded messages. The recovered messages, however, are not always in the form of complete messages but may have been broken down into a plurality of components or packets. For example, because the original message was not or could not be delivered, that message is recorded into a log and can be broken into the components or packets before it is entered into the log. In order to facilitate routing and reassembly, the components or packets include the information necessary for the routing and reassembly of each component, for example in a header associated with that component.

The recovery program obtains this destination and reassembly information, for example, through the record log of the messages stored in the location internal to the first program. Therefore, in another embodiment, the recovery program extracts a plurality of component messages or record logs from the destination internal to the first program. Each component message contains at least a portion of a message intended for delivery from the first program to the second program, routing information and information necessary for the reassembly of component message at the message destination. The recovery program reassembles the component messages as necessary to recreate the original messages 2 by making the necessary associations among the numerous component messages to create complete messages.

In order to facilitate processing of the recovered plurality of stranded message, the recovery program creates a stranded message file 3 on a memory medium and in a memory location accessible by the recovery program. In one embodiment, this memory location and medium within the programmed computer containing the recovery program. The recovery program saves the extracted stranded messages to the stranded message file. In one embodiment, the recovery program extracts the messages and message components, reassembles of the message components, creates the stranded message file and saves the messages to the stranded message using existing tools, such as software program tools, created for use with the first computer program. Suitable existing tools include Queue Control Facility, commercially available from IBM Corporation of Armonk, N.Y. The recovery program can use existing software tools to carry out these steps by containing computer executable code that acts as a call to the software tools.

The user or party attempting to recover stranded messages from the first program selects a middleware program to be used for delivery of the recovered messages 4 and further identifies at least one message queue within the selected middleware for receipt and routing of the recovered messages 5. The message queue represents a memory location in a computer readable memory medium that is accessible and readable by the middleware and provides a temporary location for receipt of messages to be forwarded to the second program. In one embodiment, this memory location and medium are disposed within the programmed computer containing the recovery program. The user can select the middleware program and can identify the message queue as, for example, inputs to the computer executable code embodying the present method. Inputting the user's selections is facilitated by data entry prompts and graphical interfaces provided by the recovery program. Suitable data entry prompts and graphical interfaces are known and available in the art. Alternatively, a separate recovery program is developed for interfacing with each one of a plurality of middleware programs. In this embodiment, the user selects a middleware program by choosing and running the recover program developed for the desired middleware program.

Based upon the selected middleware and the identified message queue, the recovery program connects to the middleware and opens the queue 6 by accessing the appropriate location on the computer readable storage medium in which the stranded message file was saved. The recovery program reads a recovered message from the stranded message file 7. In one embodiment, the entire contents of each recovered message or message component is read. In another embodiment, only a header associated with each recovered message or message component containing the original destination information is read. The recovery program confirms that each recovered message was intended for a location external to the first program and identifies that destination 8.

Once the recovery program identifies the destination of a message, the message queue receives that message and holds the message until the middleware program routes the message to the second computer program. In order to facilitate reception of the message in the queue and routing of the message by the middleware program, the recovery program reformats each message to a format compatible with the selected middleware 9 and delivers the appropriately formatted message to the identified message queue 10. The middleware program, independent of the recovery program, then delivers the extracted message to the original destination. In order to provide for the delivery of all of the recovered messages, the recovery program includes an algorithm to determine if any additional recovered and unread messages remain in the stranded message file 11. If such additional messages exist, the recovery method repeats the steps necessary to recover, reformat and deliver each remaining message to the message queue. Any algorithm used for iteratively reading and extracting the entire contents of a list or computer file is suitable for use with the present method to read all of the messages within the stranded message file. Examples of suitable algorithms include if/then-type logic loops.

If no more messages exist in the stranded message file, the recovery program closes the message queue and disconnects from the middleware 12. The recovery program according to a method of the present invention, also provides for the generation of reports 13. Suitable reports contain information about the method including whether or not the recover process was successful, the number of messages recovered, and the delivery locations of the recovered messages. The recovery program generates these reports by delivery data necessary to create these reports to hardware output devices such as computer monitors and computer monitors. Alternatively, the recovery program saves the necessary report data to a computer readable storage medium.

An exemplary application of the method of the present invention is illustrated by the following computer executable code.

```
*************************************************************************
*MQREQUE:   REQUEUE MESSAGES ORIGINALLY (MISTAKENLY) ENQUEUED
            TO AN IMS LTERM, INSTEAD TO AN OTMA DESTINATION,
            NAMELY MQ.
Input parms to this program are:
            Qmgr name   A local queue manager. For running on MVS, the name will be
                        4 chars.
            Queue name  This is the name of the queue that will receive the messages,
                        probably a remote queue.
Assumptions:
            An IMS component message will never be more than 32767 (since LL is a
halfword).
            Max message to be inserted to MQ is 4MB. (Both these assumptions are used
            to determine GETMAIN size.)
            QCF will be used to extract the messages to be requeued, and the output file
            will be input to this program. (QCF sorts and assembles the log records by
            segment, making the logic of this program much simpler.)
Output:
            All error messages are written to SYSPRINT. If program is successful, a
            status message will be printed to indicate number of messages inserted to MQ.
*************************************************************************
              PRINT       NOGEN
MQREQUE       CSECT
MQREQUE       AMODE       31
              SAVE        (14,12),,MQREQUE-&SYSDATE-&SYSTIME
              LR          R12,R15             Base register
              LR          R11,R12
              LA          R11,2048(R11)       May need 2 bases
              LA          R11,2048(R11)
              USING       MQREQUE,R12,R11     Addressability
              ST          R13,SAVEAREA+4      Backward pointer
              LA          R13,SAVEAREA        Set addr of out savearea
              XC          EXITCODE,EXITCODE   Init return code
              ST          R1,PARMS            Save input parm address
              OPEN        (SYSPRINT,(OUTPUT))
              BAL         R8,GETPARMS         PROCESS INPUT PARMS
              L           R15,EXITCODE        CHECK RETURN
              LTR         R15,R15             ZERO?
              BNZ         RETURN              NO, LEAVE
              L           R3,BUFFERLENGTH
              GETMAIN     RU,LV=(R3),LOC=(RES,ANY) GET SOME STORAGE
              LR          R9,R1               Address of storage
              USING       MQBUFFER,R9         Set addressability
              OPEN        (IMSREC,INPUT)
*
MAINCONN      DS          0H
              XC          HCONN,HCONN         Null connection handle
              CALL        MQCONN,                                    X
                          (MQMNAME,                                  X
                          HCONN,                                     X
                          COMPCODE,                                  X
                          REASON),                                   X
                          MF=(E,PARMLIST),VL
              LA          R0,MQCC_OK          Expected compcode
              C           R0,COMPCODE         As expected ?
              BE          MAINOPEN            Yes, continue with process
*
              MVC         MQERRTYP,=CL10'CONNECT '
              BAL         R7,FMTERROR         Translate error
              LA          R0,8                Set exit code
              ST          R0,EXITCODE         to 8
              B           ENDPROG             End the program
*
MAINOPEN      DS          0H
              LA          R0,MQOT_Q           Object is a queue
              ST          R0,OBJDESC_OBJECTTYPE    In object type field
              MVC         OBJDESC_OBJECTNAME,MQMQUEUE Move queue name
              LA          R0,MQOO_OUTPUT      Indicate open is
              ST          R0,OPTIONS                 FOR OUTPUT
*
              CALL        MQOPEN,                                    X
                          (HCONN,                                    X
                          OBJDESC,                                   X
                          OPTIONS,                                   X
                          HOBJ,                                      X
                          COMPCODE,                                  X
```

-continued

```
                              REASON),                              X
                              MF=(E,PARMLIST),VL
*
              LA      R0,MQCC_OK         Expected compcode
              C       R0,COMPCODE        As expected?
              BE      MAINPUT            Yes .. continue
              MVC     MQERRTYP,CL10'OPEN '
              BAL     R7,FMTERROR        Translate error
              LA      R0,8               Set exit code
              ST      R0,EXITCODE        to 8
              B       MAINDISC           Return to disconnect from
*                                        qmgr and terminate program
MAINPUT       DS      0H
              XC      MSGDESC_CORRELID,MSGDESC_CORRELID Null
                                                   correlation id
              XC      MSGDESC_MSGID,MSGDESC_MSGID   Null message id
              MVC     MSGDESC_FORMAT,=CL8'MQIMS'
              LA      R4,BUFFER          BUILD MQ BUF ADDR
              A       R4,MQOFFSET   SKIP DOWN IN BUFFER TO START MQ
              LR      R10,R4             SAVE THE ADDRESS
              MVC     MYIIH_FORMAT,=CL8'MQIMSVS'
              MVC     0(MYIIH_LENGTH,R10),MYIIH   MOVE IN IIH
              LA      R4,MYIIH_LENGTH(R4)
GETNEXT       DS      0H
              GET     IMSREC,BUFFER      GET INPUT RECORD
              LA      R1,BUFFER          START OF BUFFER
              USING   MRPREFIX,R1        MAP THE MSG REQUEUER PREFIX
              AH      R1,MSGMRQLL        ADD LENGTH OF MR PREFIX
              DROP    R1
              USING   MSGPRFX,R1         03 LOG RECORD PREFIX
              LR      R2,R1              R2 WILL POINT TO PAYLOAD
              AH      R2,MSGPRFLL        ADD PREFIX LENGTH
              LH      R3,MSGLRLL         GET LL
              SH      R3,MSGPRFLL        SUBTRACT PREFIX LENGTH
              LR      R5,R3              LEN FOR MVCL
              MVCL    R4,R2        MOVE MSG SEGMENT TO MQ MSG BUF
              TM      MSGFLAGS,MSGFLAST  WAS THIS LAST RECORD?
              BNO     GETNEXT            NO, KEEP AT IT
              SR      R4,R10             COMPUTE LENGTH OF MESSAGE
*
DOPUT         DS      0H
              ST      R4,MSGBUFLEN
              L       R6,PUTCOUNT
              LA      R6,1(R6)
              ST      R6,PUTCOUNT
              CALL    MQPUT,                                        X
                      (HCONN,                                       X
                      HOBJ,                                         X
                      MSGDESC,                                      X
                      PUTMSGOPTS,                                   X
                      MSGBUFLEN,                                    X
                      0(R10),                                       X
                      COMPCODE,                                     X
                      REASON),                                      X
                      MF=(E,PARMLIST),VL
*
              LA      R0,MQCC_OK         Load compcode MQCC_OK
              C       R0,COMPCODE        As expected?
              BE      MAINPUT            LOOP UNTIL FINISHED
              MVC     MQERRTYP,=CL10'PUT '
              BAL     R7,FMTERROR        Translate error
              LA      R0,8               Set exit code
              ST      R0,EXITCODE        To 8
              B       MQCLOSE            Return to caller
*
*-------------------------------------------------------------*
* CLOSE THE QUEUE                                             *
*-------------------------------------------------------------*
MQCLOSE       DS      0H
              LA      R0,MQCO_NONE       Indicate normal close
              ST      R0,OPTIONS         of the queue
*
              CALL    MQCLOSE,                                      X
                      (HCONN,                                       X
                      HOBJ,                                         X
                      OPTIONS,                                      X
                      COMPCODE,                                     X
```

|            |           | REASON),<br>MF=(E,PARMLIST),VL               |                              | X |
|------------|-----------|---------------------------------------------|------------------------------|---|
| *          |           |                                             |                              |   |
|            | LA        | R0,MQCC_OK                                  | Expected compcode            |   |
|            | C         | R0,COMPCODE                                 | As expected?                 |   |
|            | BE        | MAINDISC                                    | Yes . . continue             |   |
|            | L         | R0,EXITCODE                                 | PREVIOUS ERROR?              |   |
|            | LTR       | R0,R0                                       | CHECK EXITCODE               |   |
|            | BNZ       | MAINDISC                                    | DON'T RUIN PREV MSG          |   |
|            | MVC       | MQERRTYP,=CL10'CLOSE    '                   |                              |   |
|            | BAL       | R7,FMTERROR                                 | Translate error              |   |
|            | LA        | R0,8                                        | Set exit code                |   |
|            | ST        | R0,EXITCODE                                 | To 8                         |   |
|            | B         | MAINDISC                                    | DO DISCONNECT                |   |
| *          |           |                                             |                              |   |
| MAINDISC   | DS        | 0H                                          |                              |   |
| *          |           |                                             |                              |   |
|            | CALL      | MQDISC,                                     |                              | X |
|            |           | (HCONN,                                     |                              | X |
|            |           | COMPCODE,                                   |                              | X |
|            |           | REASON),                                    |                              | X |
|            |           | MF=(E,PARMLIST),VL                          |                              |   |
| *          |           |                                             |                              |   |
|            | LA        | R0,MQCC_OK                                  | Expected compcode            |   |
|            | C         | R0,COMPCODE                                 | As expected?                 |   |
|            | BE        | ENDPROG                                     | Yes .. continue              |   |
|            | L         | R0,EXITCODE                                 | PREVIOUS ERROR?              |   |
|            | LTR       | R0,R0                                       | CHECK EXITCODE               |   |
|            | BNZ       | ENDPROG                                     | DON'T RUIN PREV MSG          |   |
|            | MVC       | MQERRTYP,=CL10'DISCONNECT'                  |                              |   |
|            | BAL       | R7,FMTERROR                                 | Translate error              |   |
|            | LA        | R0,8                                        | Set exit code                |   |
|            | ST        | R0,EXITCODE                                 | To 8                         |   |
|            | B         | ENDPROG                                     | Return to caller             |   |
| *          |           |                                             |                              |   |
| ENDPROG    | DS        | 0H                                          |                              |   |
|            | L         | R15,EXITCODE                                | Load termination code        |   |
|            | LTR       | R15,R15                                     | ANY ERROR MSG FOR USER?      |   |
|            | BZ        | PRINT_RESULTS                               | no, skip writing error       |   |
|            | PUT       | SYSPRINT,MQERR                              |                              |   |
| PRINT_RESULTS | DS     | 0H                                          |                              |   |
|            | L         | R0,PUTCOUNT                                 | Translate put count          |   |
|            | CVD       | R0,WORKWD                                   | To packed decimal            |   |
|            | UNPK      | CONVERT,WORKWD+4(4)                         | Convert to zoned decimal     |   |
|            | MVZ       | CONVERT+7(1),CONVERT+6                      | Make it displayable          |   |
|            | MVC       | MQPUTCNT,CONVERT                            | Move to display area         |   |
|            | PUT       | SYSPRINT,STATSMSG                           |                              |   |
| *          |           |                                             |                              |   |
| RETURN     | DS        | 0H                                          |                              |   |
|            | L         | R15,EXITCODE                                |                              |   |
|            | L         | R13,4(R13)                                  | Readdr caller SAVEAREA       |   |
|            | L         | R14,12(R13)                                 | Restore registers            |   |
|            | LM        | R0,R12,20(R13)                              | Restore registers            |   |
|            | BR        | R14                                         | Return to caller             |   |
| *          |           |                                             |                              |   |
| *************************************************************** |
| * MAKE THE ERROR CODE PRINTABLE                               * |
| *************************************************************** |
| FMTERROR   | DS        | 0H                                          |                              |   |
|            | L         | R0,COMPCODE                                 | Translate compcode           |   |
|            | CVD       | R0,WORKWD                                   | To packed decimal            |   |
|            | UNPK      | CONVERT,WORKWD+4(4)                         | Convert to zoned decimal     |   |
|            | MVZ       | CONVERT+7(1),CONVERT+6                      | Make it displayable          |   |
|            | MVC       | MQERRCC,CONVERT+4                           | Move to display area         |   |
| *          |           |                                             |                              |   |
|            | L         | R0,REASON                                   | Translate reason             |   |
|            | CVD       | R0,WORKWD                                   | To packed decimal            |   |
|            | UNPK      | CONVERT,WORKWD+4(4)                         | Convert to zoned decimal     |   |
|            | MVZ       | CONVERT+7(1),CONVERT+6                      | Make it displayable          |   |
|            | MVC       | MQERRRC,CONVERT+4                           | Move to display area         |   |
|            | BR        | R7                                          | Return to caller             |   |
| *          |           |                                             |                              |   |
| *************************************************************** |
| * CONSTANTS, DATA                                             * |
| *************************************************************** |
| SAVEAREA   | DS        | 9D                                          | Save area                    |   |
| MSGBUFLEN  | DS        | F                                           | LENGTH OF MSG FOR MQ         |   |
| PUTCOUNT   | DC        | F'0'                                        |                              |   |

-continued

| | | | |
|---|---|---|---|
| CONVERT | DS | CL8 | Used for data conversion |
| BUFFERLENGTH | DC | P'4033000' | max mem for msg + logrec |
| MQOFFSET | DC | P'33000' | OFFSET TO MQ MSG IN BUF |
| BLANKS | DC | CL48' ' | |
| MIN_PARM_LEN | DC | P'6' | |
| MAX_PARM_LEN | DC | P'53' | |
| * | | | |
| | PRINT | NOGEN | |
| OBJDESC | CMQODA | DSECT=NO,LIST=YES | Object descriptor |
| MSGDESC | CMQMDA | DSECT=NO,LIST=YES | Message descriptor |
| PUTMSGOPTS | CMQPMOA | DSECT=NO,LIST=YES | PUT message options |
| MYIIH | CMQIIHA | DSECT=NO,LIST=YES | PUT message options |

```
*****************************************************************
* DCBS                                                           *
*****************************************************************
            PRINT    NOGEN
SYSPRINT    DCB      DDNAME=SYSPRINT,                            X
                     DSORG=PS,,                                  X
                     LRECL=133,                                  X
                     BLKSIZE=7980,                               X
                     MACRF=PM,                                   X
                     RECFM=FBA
IMSREC      DCB      DDNAME=IMSREC,
                     DSORG=PS,MACRF=GM,EODAD=MQCLOSE
*
*****************************************************************
* MQ API CONSTANTS                                               *
*****************************************************************
CMQA LIST=YES
*****************************************************************
* PROCESS INPUT PARMS                                            *
*****************************************************************
GETPARMS    DS       0H
            MVC      MQMNAME,BLANKS     BLANK OUT QMGR NAME
            MVC      MQMQUEUE,BLANKS    BLANK OUT QUEUE NAME
            L        R1,PARMS
            L        R1,0(R1)           PARM ADDRESS
            LH       R6,0(R1)           LENGTH OF PARMS
            LTR      R6,R6              ANYTHING THERE?
            BZ       BADPARM            NO, GO COMPLAIN
            C        R6,MIN_PARM_LEN    IS THERE ENOUGH DATA?
            BL       BADPARM            NO, GO COMPLAIN
            C        R6,MAX_PARM_LEN    IS THERE TOO MUCH DATA?
            BH       BADPARM            YES, GO COMPLAIN
            LA       R1,2(R1)           SKIP PAST PARM LENGTH
            CLI      4(R1),C','         4 CHARS THEN COMMA
            BNE      BADPARM            ERROR
            MVC      MQMNAME(4),0(R1)   OK, COPY QMGR NAME
            LA       R1,5(R1)           SKIP TO NEXT PARM
            SH       R6,=H'5'           AND ADJUST REMAINING LEN
            LA       R2,MQMQUEUE        START OF QUEUE NAME TARGET
QLOOP       DS       0H
            MVC      0(1,R2),0(R1)      COPY 1 PARM CHAR AT A TIME
            LA       R1,1(R1)           INCREMENT PARM POINTER
            LA       R2,1(R2)           INCREMENT TARGET POINTER
            SH       R6,=H'1'           DECREMENT LENGTH LEFT
            LTR      R6,R6              ANY PARM LEFT?
            BNZ      QLOOP              YES, LOOP TILL DONE
            PUT      SYSPRINT,QMMSG     REPORT QMGR NAME
            PUT      SYSPRINT,QNMSG     REPORT QUEUE NAME
            BR       R8                 Return to caller
BADPARM     DS       0H                 INVALID INPUT PARMS
            PUT      SYSPRINT,PARMMSG   REPORT INVALID PARMS
            LA       R0,4
            ST       R0,EXITCODE        NON-ZERO RETURN CODE
            BR       R8                 Return to caller
*
*****************************************************************
* DATA AREAS                                                     *
*****************************************************************
EXITCODE    DS       F
PARMS       DS       F
GETMSGOPTS  CMQGMOA DSECT=NO,LIST=NO    Get message options
*
PARMLIST CALL ,(0,0,0,0,0,0,0,0,0,0),VL,MF=L
*
WORKWD      DS       D                  Used for data conversion
*
```

-continued

```
*--------USED BY MQI CALLS------------------------------------------------------------------*
*
OPTIONS     DS          F               Options
COMPCODE    DS          F               Completion code
REASON      DS          F               Reason code
HCONN       DS          F               Connection handle
HOBJ        DS          F               Connection handle
OBJECT      DS          F               Object handle
*
****************************************************************************
* ERROR MSGS                                                               *
****************************************************************************
*
PARMMSG     DS          0CL133
            DC          C' '
            DC          CL10' '
            DC          CL50'** INVALID INPUT PARMS. EXPECTED 4 CHAR
                             QMGR NAME'
            DC          CL50', COMMA, AND QUEUE NAME (UP TO 48 CHARS).
                             ***** '
            DC          CL22' '
*
QMMSG       DS          0CL133
            DC          C' '
            DC          CL10' '
            DC          CL10'========>>'
            DC          CL30' DESTINATION QUEUE MANAGER: '
MQMNAME     DC          CL48' '
            DC          CL34' '
*
QNMSG       DS          0CL133
            DC          C' '
            DC          CL10' '
            DC          CL10'========>>'
            DC          CL30' DESTINATION QUEUE NAME:   '
MQMQUEUE    DC          CL48' '
            DC          CL34' '
*
MQERR       DS          0CL133
            DC          C' '
            DC          CL23'* AN ERROR OCCURRED IN'
MQERRTYP    DS          CL10
            DC          CL20'. COMPLETION CODE = '
MQERRCC     DS          CL04
            DC          CL16' REASON CODE = '
MQERRRC     DS          CL04
            DC          CL10' *********'
            DC          CL50' '
*
STATSMSG    DS          0CL133
            DC          C' '           CC
            DC          CL10' '
            DC          CL11'========>>'
MQPUTCNT    DC          CL8' '
            DC          CL103' MESSAGE(S) SUCCESSFULLY ENQUEUED.'
            PRINT       NOGEN
****************************************************************************
* DSECTS USED BY THIS PROGRAM                                              *
****************************************************************************
            ILOGREC RECID=03,TYPE=DSECT
            DFSMRQPF
MQBUFFER    DSECT
BUFFER      DS          0C              START OF MESSAGE
*
            REQUATE
MQREQUE     CSECT
LTORG
END
```

Other embodiments and uses of the present invention will be apparent to those skilled in the art from consideration of this application and practice of the invention disclosed herein. The present description and examples should be considered exemplary only, with the true scope and spirit of the invention being indicated by the following claims. As will be understood by those of ordinary skill in the art, variations and modifications of each of the disclosed embodiments, including combinations thereof, can be made within the scope of this invention as defined by the following claims.

What is claimed is:

1. A method for recovering a plurality of messages intended for delivery to a destination computer executable program but stranded in a destination internal to a first computer executable program and not capable of the intended delivery to the destination computer executable program through a middleware computer executable program, the method comprising:

using a recovery program to extract a plurality of stranded messages broken into plural components from the destination internal to the first program, each component message comprising at least a portion of a stranded message;

reassembling the component stranded messages into the plurality of stranded messages necessary to recreate the original messages;

creating a stranded message file;

placing each recreated stranded message in the stranded-message file;

selecting the middleware program to facilitate delivery of the recreated stranded messages to the destination program;

identifying a stranded message queue within the selected middleware program;

reading each recreated stranded message saved in the stranded-message file to determine the intended destination program for each recreated stranded message;

formatting each recreated stranded message for the selected middleware program;

placing each recreated stranded message in the queue; and forwarding the recreated extracted messages from the queue for delivery to the intended destination program.

2. The method of claim 1, further comprising:

connecting to the middleware program; and opening the identified queue.

3. The method of claim 1, further comprising reporting the results of the recovery method.

4. Computer executable software code stored on a computer readable medium, the code for recovering a plurality of messages stranded in an unintended destination internal to a first computer executable program and not capable of intended delivery to an intended destination at a second computer executable program through a middleware computer executable program, the code comprising:

code to extract a plurality of stranded messages broken into plural components from the destination location internal to the first program, each component message comprising at least a portion of a stranded message;

code to reassemble the component stranded messages into the plurality of stranded messages as necessary to recreate the original messages;

code to open the middleware program and to connect to an identified message queue within the middleware program to facilitate delivery of the recreated stranded messages to the second program;

code to read a portion of each recreated stranded message to determine a desired destination for each recreated stranded message;

code to format each recreated stranded message for the selected middleware; and code to place each recreated stranded message in the queue.

5. The computer executable software code of claim 4, further comprising:

code to create a stranded message file and to save all of the recreated stranded messages in that file; and code to read each recreated stranded message saved in the stranded message file.

6. The computer executable software code of claim 4, further comprising code to report the results of the stranded message recovery.

7. A programmed computer for recovering a plurality of stranded messages from a destination internal to a first computer executable program and not capable of intended delivery to an intended destination at a second computer executable program through a middleware computer executable program, the programmed computer comprising a memory having at least one region storing computer executable program code and a processor for executing the program code stored in the memory, wherein the program code includes:

code to extract a plurality of stranded messages broken into plural components from the destination internal to the first program, each component message comprising at least a portion of a stranded message;

code to reassemble the component stranded messages into the plurality of stranded messages as necessary to recreate the original messages;

code to open the middleware program and to connect to an identified message queue within the middleware program to facilitate delivery of the recreated stranded messages to the second program;

code to read a portion of each recreated stranded message to determine a desired destination for each recreated message;

code to format each recreated stranded message for the selected middleware; and code to place each recreated stranded message in the queue.

8. The programmed computer of claim 7, wherein the code further comprises:

code to create a stranded message file and to save all of the recreated stranded messages in that file;

code to read each recreated stranded message saved in the stranded message file.

9. The programmed computer of claim 7, wherein the code further comprises code to report the results of the stranded message recovery.

\* \* \* \* \*